July 20, 1948.  D. C. GINNINGS  2,445,350
MULTIPLE EFFECT SOLAR STILL
Filed Dec. 23, 1943  2 Sheets-Sheet 1

INVENTOR
DEFOE C. GINNINGS
BY
ATTORNEY

Patented July 20, 1948

2,445,350

UNITED STATES PATENT OFFICE 2,445,350

MULTIPLE-EFFECT SOLAR STILL

Defoe C. Ginnings, Macomb, Ill.

Application December 23, 1943, Serial No. 515,352

6 Claims. (Cl. 202—172)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to an improved device for distillation, or more specifically, for using solar heat to distill sea water to obtain potable water.

Prior to my invention, all solar stills of which I have knowledge have been the single-effect type—that is, the energy received from the sun has been used only once for distillation. As a result, efforts to devise solar stills which are applicable to emergency use in rubber life rafts have not been very successful because the area, weight, and complications have been excessive in proportion to the water obtainable from them.

It is an object of my invention, therefore, to devise a means of using the sun's energy more than once to distill water, thereby greatly increasing the amount of water obtainable from a given area exposed to sunlight.

It is a further object of my invention to devise a method of decreasing the weight of the solar still to such a degree that its weight is small in comparison with the amount of water it can distill in a reasonable period.

It is a still further object of my invention to provide a solar still which occupies little space, either in storage or in use; has no rigid parts, and requires the minimum of attention.

It has been the practice in multiple-effect stills to distill in absence of air and vary the total pressure of the distilling material from stage to stage. However, the application of a solar still to a life raft practically excludes the multiple-stage still with total pressure changing from stage to stage. Therefore, a still has been devised in which the total pressure has been kept constant from stage to stage, while the partial pressure of water has been varied.

Figures 1, 2:
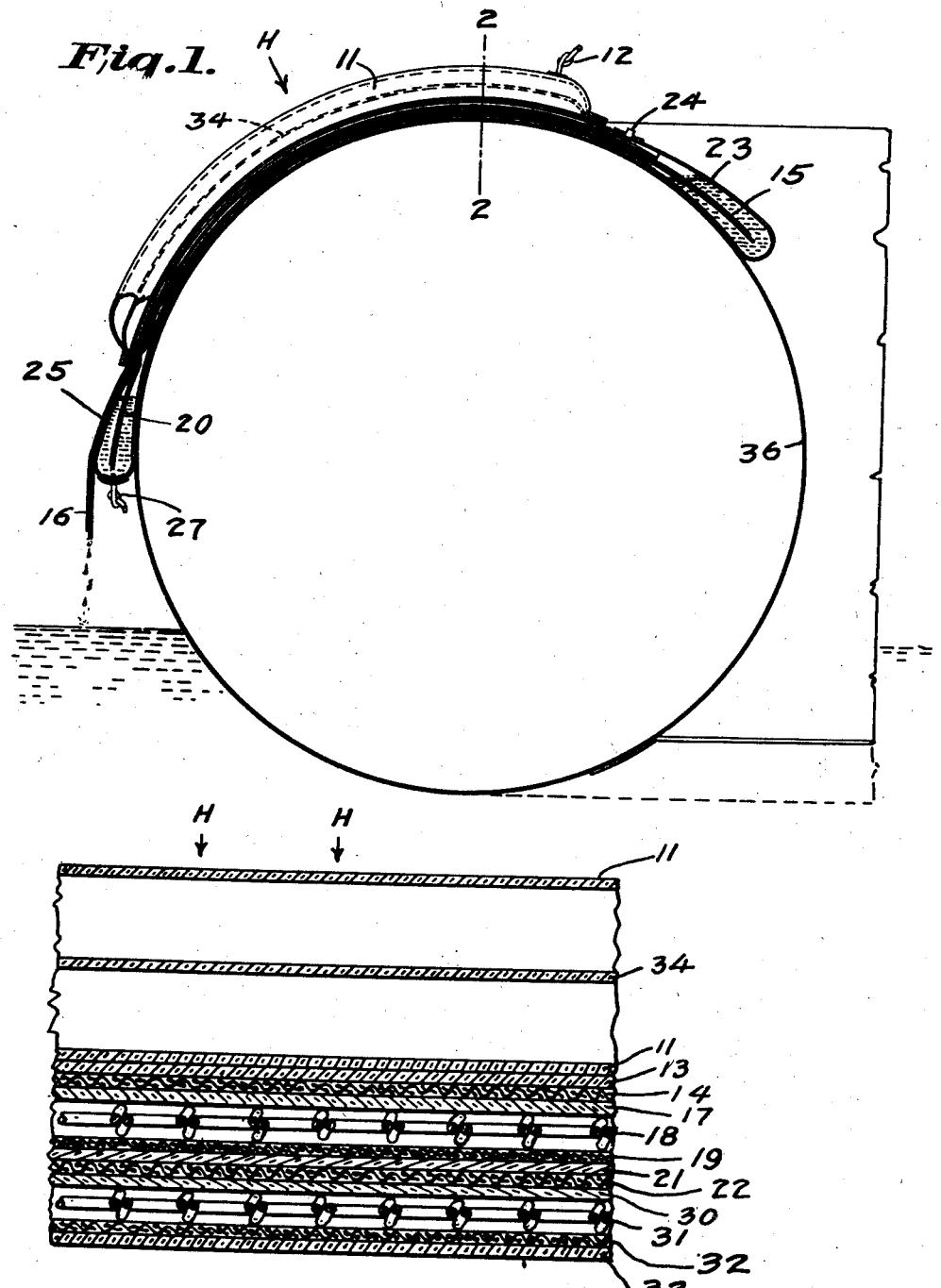
Figure 1 is an elevation partly in section, as it may be positioned upon a rubber life raft.
Figure 2 is an enlarged section on the line 2—2 of Figure 1, of a two-stage still having two spaced transparent windows.

In these drawings (see Fig. 3), 11 represents a waterproof plastic window provided with means for inflating the same with air, here shown as a flexible tube 12 which may be knotted at will to prevent the egress of air. A blackened water and vapor-proof film 13 is directly beneath the window 11 and may be the underside of an inflatable bag, of which the window 11 forms the face and beneath the film 13 is an evaporator wick 14 having an extension 15 for transferring a supply of sea water or other non-potable water to and through the body of the wick, and one or more extensions 16 protruding from the opposite margin of said wick 14. Directly beneath and in contact with the wick is a water vapor transmitting film 17 and beneath the film 17 is a non-wetting spacer 18, here shown as a large mesh screen having single strands in one direction passing through loops of two twisted strands at right angles thereto. Beneath the spacer 18 is a layer of condenser cloth 19 having an extension 20 and underlying the main portion of the cloth 19 is a water and vapor-proof film 21. The waterproof film 21 is in thermal contact with a second evaporator wick 22 of a second still. The extension 15 of the wick 14 is enclosed within a water supply pocket 23 which may be closed by a zipper 24. The extension 20 of the condenser cloth 19 projects into a distillate collectig pocket 25 which may be secured against spreading by stitching 26. The pocket 25 is provided with a drain outlet 27, here shown as a knotted flexible tube. For securing my still against accidental loss while in use, such as by wind or wave action, I provide suitable means for lashing the device in place such as cords 28 fastened by loops 29.

Figure 2 discloses a section of a two-stage still having two spaced transparent windows, the thicknesses of the layers being magnified for clearness. Beneath the wick 22 (Figs. 3 and 2) there are in order the vapor pervious film 30, the non-wetting spacer 31, the condenser cloth 32 and the water-and-vapor-proof film 33, thus in this second and succeeding stages the blackened layer and the plastic window are omitted because neither would assist in the efficient use of the heat passing through the first still.

Figure 1 illustrates my method of causing a gradual flow of salt water from the supply pocket through the wick to flush out the concentrated salts which would otherwise slow down the supply of water below the requirements of my still and in time substantially stop the supply of water vapor. This is accomplished by providing for a gravity assisted discharge of concentrated salt water through the wick extensions 16 which are kept substantially lower than the supply of salt water. In my multiple-stage still a single salt water pocket may supply water to a plurality of stills and the distillate may also be collected in a single distillate collecting pocket 25.

Figure 3:
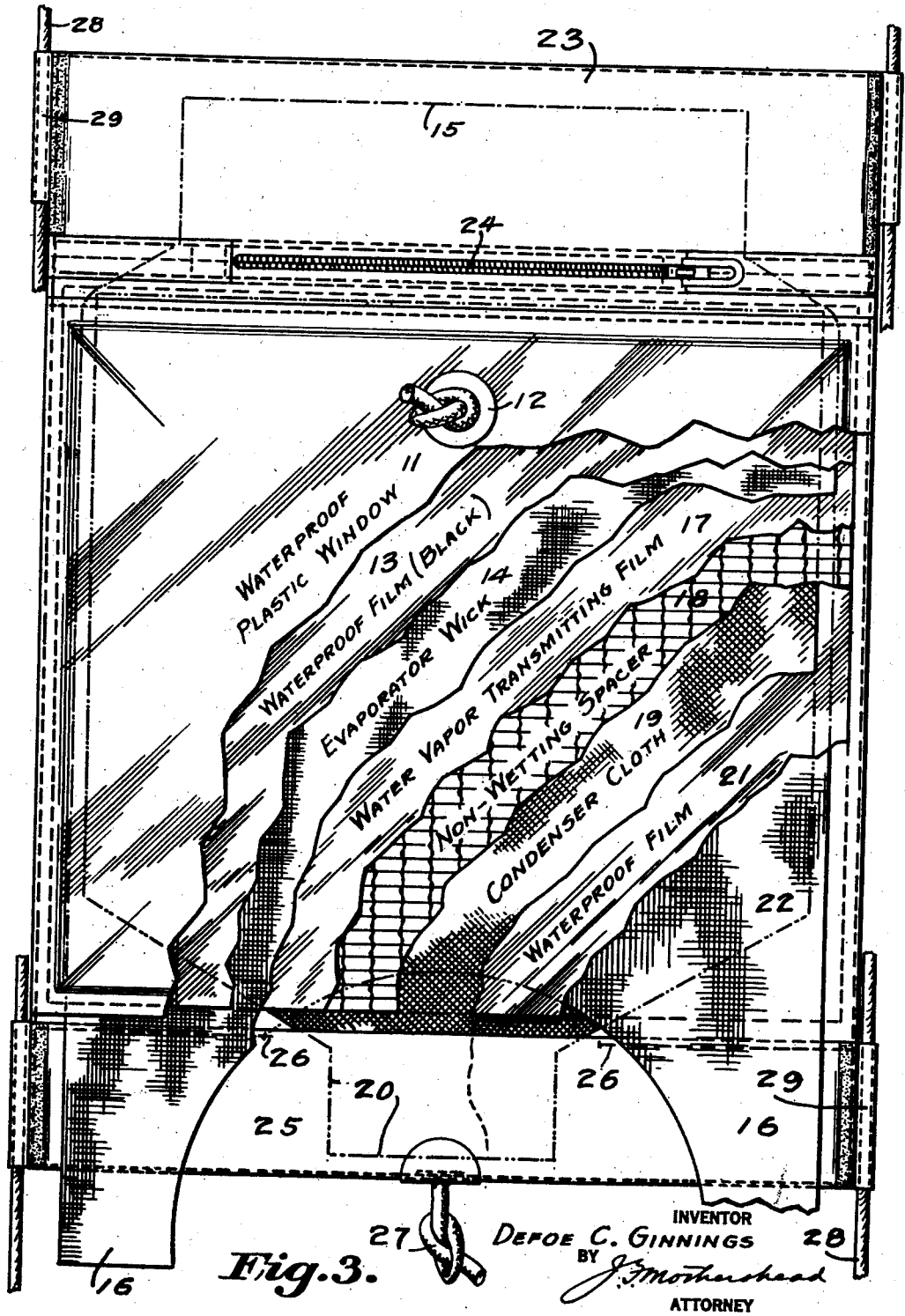
Figure 3 is a plan of a two-stage still having a single plastic window, the plastic window and other underlying layers being broken away to disclose the underlying structure.

The basic principles of operation of my multiple-effect still are illustrated in Figs. 2 and 3. In the first stage of this still, a source of heat H causes distillation of water from 14 to an absorbent layer 19 on which the water condenses. The two absorbing layers 14 and 19 are separated by a non-wetting mesh spacer 18 which holds the two layers apart, but is mostly open to allow diffusion of water vapor through air from 14 to 19.

The heat of condensation of the water on 19 in the first stage is transmitted to a second still through the waterproof layer 21, to a second layer 22 which is wet with salt water. This same heat causes distillation of water from 22 to a second condenser layer 32 (Fig. 2) which absorbs the water condensed in the second stage. A waterproof film base 33 underlies the condenser layer 32.

The heat of condensation of the water in 32 of the second stage may similarly be used in a third stage, and as many stages as may be deemed practicable.

As an aid to keeping the spacer to a minimum thickness, it was found desirable, but not necessary, to introduce between the absorbent layer 14 and the non-wetting spacer 18, the layer 17. This layer consists of a thin film of a material such as regenerated cellulose which freely transmits water vapor, but which presents a reasonably dry surface next to the non-wetting spacer.

The theory of operation of the one stage of the still is as follows: The transfer of heat from the "evaporator" layer 14 to the "condenser" layer 19 is accomplished by distillation of water, and by radiation, conduction, and convection. The design of the still is such that the heat transfer by distillation is large in comparison with all other heat transfer. This allows a high efficiency.

By making the distance between 14 and 19 small, the convective and radiant heat transfer become negligible in comparison with the heat transfer by distillation and by conduction. The heat transfer by distillation is made large compared to that by conduction by several means.

First, the amount of solid material in the separator 18 between 14 and 19 is kept to the minimum required for avoiding contact of 17 and 19 or bridging the gap by surface tension. In this way the solid conduction is minimized.

Second, the separator 18 and layer 17 are made as nonwetting as possible so that the liquid water does not bridge the gap between 17 and 19 by surface tension. In this way the liquid conduction is minimized.

Third, the still is operated at such a temperature that the heat transfer by distillation is large in comparison with the heat transfer by conduction through the air and other materials between the layers 17 and 19. Increase in the operational temperature of the still greatly increases the vapor pressure of water which causes distillation. However, increase in temperature has only slight effect on the thermal conductivity of materials.

The use of the construction principles previously described, in a solar still to be used on rubber life rafts is shown in Figure 1. The still is supported by the rubber life raft tube 36. The sun's rays H are transmitted through the plastic windows 11 and are absorbed on the black layer 13 (Fig. 3). The plastic windows with their intermediate air spaces transmit most of the sun's energy to 13, but prevent excessive loss upward of the heat produced at 13. These window-faced bags may be deflated to permit compact storage when not in use.

Layer 13, in addition to converting the sun's rays to heat, is impermeable to both liquid and vapor water. The heat thus produced in 13 passes through the multiple-effect still, through the rubber life raft tube 36, and is eventually transmitted to the sea water and air. In passing through the still, this heat produces distilled water in each of the stages in the manner previously described.

The sea water is held in the pocket 23 and flows through the evaporator layers 14 in the still by capillary and syphon action. The top ends of the evaporator layers 15 from all the stages extend into the sea water pocket 23, while the bottom ends 16 extend down to a lower level than the salt water supply to provide drainage of the concentrated sea water from the bottom ends 16. In this manner, the formation of solid salt in the evaporating layers in the still is avoided and the high efficiency of the still is maintained by providing a gradual discharge of concentrated salt water and maintaining during evaporation a sea water supply which is not too concentrated.

The water distilled in the multiple-effect still is collected in the condenser layers 19 and flows by capillary and syphon action to the bottom end 20 of the condenser layer 19 into the pocket 25 which holds the distilled water.

The plan of the multiple-effect solar still is shown in Figure 3. The still is assembled on a plastic film base 33 indicated by full lines. A pocket 23 is made in the top end to hold the sea water which is introduced by opening the zipper 24. A second pocket 25 at the bottom end is made to hold the distilled water.

The top ends 15, of the evaporator layers 14, consisting of textile material such as a thin flannel cloth, extend into pocket 23. The bottom ends, 16, of the evaporator layers are shaped so that the concentrated sea water drains away from the center and drips off. The bottom ends, 20, of the condenser layers 19, also thin textile material, extend into the pocket 25 and are designed to bring the distilled water to the center. A drain outlet 27 in the pocket 25 is used in removing the distilled water.

The evaporator and condenser layers are separated in each stage as shown in Figure 2 by a plastic screen spacer 31, and a layer 30 of such material as regenerated cellulose which freely transmits water vapor. Between successive stages is a thin layer of waterproof material such as Vinylite or Pliofilm which does not allow mixing of the condensed water in one stage with the sea water in the next stage.

On top of the assembly of the several stages of the still are located the plastic windows. The space between these windows may be inflated while in use to conserve solar heat. The edges of these windows may be sealed to the plastic foundation of the still, thus forming one complete unit which may be rolled compactly for storage.

It should be understood that the present disclosure is for the purpose of illustration only, and that the invention includes all modifications and equivalents which fall within the scope of the appended claims.

It should also be understood that my invention is not limited to the materials, dimensions or arrangement shown and described in my preferred embodiment of my still. The spacer may be of any material which is relatively non-wetting. It is possible to use a textile material which has been treated to make it non-wetting. The regenerated cellulose layer may be eliminated entirely under certain conditions, or it may be replaced by other materials having desired properties. For example, a material may be used which is permeable to vapor, but which does not allow certain compounds to diffuse through it.

The evaporator and condenser layers may be made of any material which serves to absorb the liquid and has the desired mechanical properties.

The flexible windows should be made of a material which transmits the maximum amount of sunlight, but transmits the minimum amount of radiation from the black surface. The number of windows may vary to suit the particular application. It is even possible under certain circumstances to eliminate the windows entirely and work at reduced efficiency.

The black absorbing material may be incorporated in the evaporator cloth in the first stage instead of in the waterproof layer just above it.

The arrangement of the solar still is not limited to that shown in Figures 2 and 3. The arrangement shown is merely one application possible to a rubber life raft. The solar still may be used with a support as a sunshade for the life raft, dissipating heat to the air or by evaporation of water. The sea water does not necessarily go up by capillary action. It may travel entirely down through the still by action of gravity. Again, it is possible to extend the tops of the evaporator layers directly into the sea, keeping the bottom ends inside the raft at a level lower than the sea.

The application of the multiple-effect still described is not limited to use with solar energy. Any source of heat may be applied to give multiple distillation. It is possible to turn the still over, having the evaporator layers below the condenser layers.

The number of stages which may be practical may be increased by providing interchange of heat of the distillate and sea water drainage with the input of sea water.

The multiple-effect still involving the principles described may also be used in the distillation of other materials, beside water. In fact, it is more easily adapted to materials having a lower normal boiling temperature than water, due to the increased heat transfer by distillation.

The multiple-effect still described may also be used for concentrating solutions, such as sugar or salt. The operation of all the stages at the same total pressure (atmospheric offers certain advantages over the usual method of operating the stages at different total pressures.

I claim:

1. A multiple stage solar still comprising one or more aligned windows of flexible transparent material, a light converting flexible waterproof partition in alignment with said windows and marginally sealed thereto, a liquid absorbent wick in contact with the underside of said partition provided with extensions beyond the margin of the partition, one extension adapted to draw non-potable liquid into the still, and another extension adapted to discharge concentrated liquid by syphon action, a pocket for a supply of non-potable liquid into which a portion of said wick layer extends, a screen under said absorbent layer, a second absorbent layer having an extension for directing the flow of distillate, a flexible waterproof partition beneath said screen, a waterproof flexible pocket for collecting said distillate, and one or more additional stills in thermal contact with said first still and connected with said distillate receiving pocket.

2. In a multiple stage solar still for providing a potable condensate from non-potable water the improvement which comprises an external vapor-impermeable enclosure, a layer of liquid absorbent material within said enclosure, a non-wetting vapor permeable separator in contact with said absorbent material, a second layer of liquid absorbent material in contact with the face of said separator opposite to said first layer of absorbent material serving as a condenser for vapor passing through said separator, and a second vapor-impermeable enclosure in contact with said condenser, a third layer of liquid absorbent material in contact with said second enclosure, a second non-wetting vapor permeable separator in contact with said second absorbent layer, a fourth layer of liquid absorbent material in contact with said second separator serving as a second condenser, means for supplying non-potable water to said first and third liquid absorbent layers, and means for collecting distillate from said condensers.

3. A multiple stage solar distillation apparatus comprising a heat absorbing layer, a plurality of flexible enclosures in thermal contact with each other, a layer of fluid absorbent material within each of said enclosures, a vapor absorbent layer in each enclosure a vapor pervious screen and a non-wetting spacer separating each heated fluid supplied layer from a cooler vapor absorbent layer, means for supplying liquid to said fluid supplied layers, and means for collecting the condensate from said vapor absorbing layers.

4. A flexible distillation apparatus adapted to utilize solar heat intercepted by a heat absorbing flexible layer and having an inflatable heat applying enclosure, the improvement which comprises a plurality of superimposed flexible enclosures, a fluid absorbent wick with a discharge extension within an enclosure in thermal contact with said heat applying enclosure, an absorbent condensing layer within a second enclosure, a vapor pervious screen and a non-wetting spacer separating said absorbent and condensing layers, means for supplying non-potable liquid to said absorbent layer, and means for collecting the condensate from said condensing layer.

5. A flexible distillation apparatus adapted to absorb and utilize solar heat having a heat applying enclosure and a heat intercepting layer, the improvement which comprises a plurality of superimposed flexible enclosures each in thermal contact with each adjacent enclosure, a fluid absorbent wick with a discharge extension within an enclosure in thermal contact with said heat applying enclosure, a vapor pervious screen in contact with said wick, a non-wetting spacer, an absorbent condensing layer in contact with said non-wetting screen wall, a second wick having a discharge extension in thermal contact with the side of said condensing layer remote from said first wick, a flexible receptacle for supplying non-potable liquid to said wicks, and a flexible distillate collecting receptacle.

6. A multiple stage solar distillation apparatus comprising a plurality of flexible enclosures in each thermal contact with a successive enclosure, the first of said enclosures being inflatable and having a solar heat absorbing layer, a vapor pervious screen and a non-wetting separating spacer in each enclosure, an absorbent wick with a discharge extension in the heated side of each of said enclosures and a layer of vapor absorbent material in the cooler side of each enclosure, a pocket for supplying non-potable water to each of said wicks, and a pocket for collecting and holding distillate from said condensing layers each vapor condensing layer serving to transmit heat to a succeeding enclosure.

DEFOE C. GINNINGS.

REFERENCES CITED

The following references are of record in the file of this patent:

UNITED STATES PATENTS

| Number | Name | Date |
|---|---|---|
| 552,456 | Theisen | Dec. 31, 1895 |
| 1,703,644 | Van Brunt | Feb. 26, 1929 |
| 1,812,516 | Dooley | June 30, 1931 |
| 1,881,041 | Benjamin | Oct. 4, 1932 |
| 1,958,547 | Payne | May 15, 1934 |
| 2,117,802 | Hickman | May 17, 1938 |
| 2,159,303 | Waterman | May 23, 1939 |
| 2,402,737 | Delano | June 25, 1946 |
| 2,412,466 | Miller | Dec. 10, 1946 |
| 2,413,101 | Delano | Dec. 24, 1946 |

FOREIGN PATENTS

| Number | Country | Date |
|---|---|---|
| 11,350 | Great Britain | 1889 |
| 681,133 | France | Jan. 27, 1930 |
| 37,213 | Norway | June 25, 1923 |